(12) United States Patent
Tsuneoka

(10) Patent No.: US 11,930,748 B2
(45) Date of Patent: Mar. 19, 2024

(54) RECEIVING TRAY FOR POT STAND

(71) Applicant: Cotte Co., Ltd., Nagoya (JP)

(72) Inventor: Daishi Tsuneoka, Nagoya (JP)

(73) Assignee: Cotte Co., Ltd., Aichi (JP)

( * ) Notice: Subject to any disclaimer, the term of this patent is extended or adjusted under 35 U.S.C. 154(b) by 279 days.

(21) Appl. No.: 17/601,122

(22) PCT Filed: Sep. 30, 2019

(86) PCT No.: PCT/JP2019/038591
§ 371 (c)(1),
(2) Date: Oct. 4, 2021

(87) PCT Pub. No.: WO2020/202610
PCT Pub. Date: Oct. 8, 2020

(65) Prior Publication Data
US 2022/0174888 A1    Jun. 9, 2022

(30) Foreign Application Priority Data
Apr. 4, 2019   (JP) .................................. 2019-072156

(51) Int. Cl.
*A01G 9/04*   (2006.01)
(52) U.S. Cl.
CPC .................... *A01G 9/042* (2013.01)
(58) Field of Classification Search
CPC . A01G 9/04; A01G 9/042; A47G 7/02; A47G 7/041
See application file for complete search history.

(56) References Cited

U.S. PATENT DOCUMENTS

| 2003/0221965 | A1 | 12/2003 | Seino |
| 2012/0047801 | A1* | 3/2012 | Hogan ............... A01G 9/022 47/65.5 |
| 2015/0007497 | A1 | 1/2015 | Delp |

FOREIGN PATENT DOCUMENTS

| CN | 110366967 A | * 10/2019 | .............. A01G 2/10 |
| JP | 04-369333 A | 12/1992 | |

(Continued)

OTHER PUBLICATIONS

International Search Report from International Application No. PCT/JP2019/038591, dated Nov. 19, 2019.

(Continued)

*Primary Examiner* — Monica L Perry
(74) *Attorney, Agent, or Firm* — Shih IP Law Group, PLLC.

(57) ABSTRACT

To achieve a structure that prevents water from spilling from a receiving tray when the receiving tray is pulled out from a pot stand. A receiving tray for a pot stand is adapted to receive drained water from a pot stand that includes an upper surface part having a hole and an opening. The receiving tray includes a main body that is movable with respect to the opening in a predetermined direction X, and a plurality of wave suppressing members that extend in a width direction Y on a bottom surface of the main body and are arranged at an interval in the predetermined direction X. The plurality of wave suppressing members include first wave suppressing members and a second wave suppressing member 32 that extends from a side wall surface of the main body in a gap between the first wave suppressing members in the predetermined direction X.

7 Claims, 18 Drawing Sheets

(56) References Cited

FOREIGN PATENT DOCUMENTS

| | | | |
|---|---|---|---|
| JP | 05-063241 U | 8/1993 | |
| JP | 06-010326 A | 1/1994 | |
| JP | H9-187386 A | 7/1997 | |
| JP | 2001-346451 A | 12/2001 | |
| JP | 2003-097823 A | 4/2003 | |
| JP | 2003344357 A | 12/2003 | |
| JP | 2007-236571 A | 9/2007 | |
| JP | 2016-064786 A | 4/2016 | |
| KR | 20100007706 U * | 7/2010 | ............... A01G 9/02 |
| KR | 20110011906 U * | 12/2011 | ............... A01G 9/02 |
| KR | 20160003171 U * | 9/2016 | ............... A01G 9/04 |
| WO | 2018190045 A1 | 10/2018 | |

OTHER PUBLICATIONS

Notice of Reasons for Refusal (Patent Application 2020-505284), dated Feb. 14, 2020.

* cited by examiner

RECEIVING TRAY FOR POT STAND

TECHNICAL FIELD

The present disclosure relates to a receiving tray for a pot stand that enables easy disposal of water drained from a bottom of a pot in watering to a potted plant such as a foliage plant.

BACKGROUND

Patent Literature 1 discloses a water reserving-type pot stand with a water collecting tray that receives drained water. The pot stand of Patent Literature 1 includes a pot mounting part in a shape of covering a bottom of a pot and having a hole at a center thereof. The pot stand further includes a funnel-shaped saucer that is provided in correspondence to the hole. After watering to a plant, water drained from the bottom of the pot flows down through the funnel-shaped saucer to the water collecting tray that is positioned under the funnel-shaped saucer.

Patent Literature 2 discloses a pot stand that includes a pot mount having a hole, a packing in a shape of inverse cone that fits to the hole, and a water reservoir that is provided under the mount.

CITATION LIST

Patent Literature

Patent Literature 1: JP2001-346451
Patent Literature 2: WO2018/190045A1

SUMMARY

Technical Problem

In each of the pot plates disclosed in Patent Literatures 1 and 2, when the pot plate is pulled out, water in the pot plate splashes out in the traveling direction of the pot plate due to the reaction of the momentum and spills down, which causes inconvenience of troublesome cleaning.

It is an object of the present disclosure to prevent water from spilling from a receiving tray in which drained water is received when the receiving tray is removed from a pot stand.

Solution to Problem

In view of the above problem, an aspect of the present disclosure is a receiving tray for a pot stand (hereinafter referred to as the tray) that includes an upper surface part having a hole and a side surface portion having an opening. The receiving tray is retractable with respect to the opening. The receiving tray includes a main body and a plurality of wave suppressing plates. The main body has a bottom surface and a side wall surface and is movable with respect to the opening. The plurality of wave suppressing plates are erected on the bottom surface at an interval in a take-out direction. At least one end of each of the wave suppressing plates is a free end. A gap is provided from the free end to the side wall surface. The free end of the wave suppressing plate has a curved surface which extends toward a direction opposite to the take-out direction in a plan view. The structure of "the end having a curved surface" may also refer to a shape of the wave suppressing plate having an entirely curved surface as long as the wave suppressing plate includes a curved surface at the end. Specifically, a semi-circular shape may be included. The receiving tray for the pot stand may be received or mounted in an opening of the post stand. For example, the post stand may have a drawer structure and the tray may be moved retractably with respect to the drawer structure in a predetermined direction, or the tray may be mounted in the opening and moved retractably in a predetermined direction. The "predetermined direction" is defined as a longitudinal direction or a lateral direction when the tray is rectangular, and a predetermined fixed direction when the tray is round, polygonal, or the like.

Another aspect of the present disclosure is a receiving tray for a pot stand that includes an upper surface part having a hole and a side surface portion having an opening. The receiving tray is retractable with respect to the opening. The receiving tray includes a main body and a plurality of wave suppressing plates. The main body has a bottom surface and a side wall surface and is movable with respect to the opening. The plurality of wave suppressing plates are erected on the bottom surface at an interval in a take-out direction. At least one end of each of the wave suppressing plates is a free end. A gap is provided from the free end to the side wall surface. The free end of the wave suppressing plate has an inclined surface which inclines toward a direction opposite to the take-out direction in a plan view. The inclination angle structure of "the end having a curved surface" may also refer to a shape of the wave suppressing plate having a entirely curved surface as long as the wave suppressing plate includes a curved surface at the end. Specifically, a semi-circular shape may be included. The inclination angle may be appropriately set in the range of 2 to 178 degrees. The wave suppressing plates may extend in the width direction. For example, the range may be within 45 degrees with respect to a direction orthogonal to the predetermined direction. The "plate-shaped member" may be linear (for example, a rectangular parallelepiped shape or the like) or curved (for example, a U-shape or a divided cylindrical shape), and may have a constant or variable thickness.

Another aspect of the present disclosure is a receiving tray for a pot stand that includes an upper surface part having a hole and a side surface portion having an opening. The receiving tray is retractable with respect to the opening. The receiving tray includes a main body and a plurality of wave suppressing plates. The main body has a bottom surface and a side wall surface and is movable with respect to the opening. The plurality of wave suppressing plates are erected on the bottom surface at an interval in a take-out direction. At least one end of each of the wave suppressing plates is a free end. A gap is provided from the free end to the side wall surface. The main body includes a U-shaped inner wall surface in the middle portion to form a groove. The groove engages with a supporting portion which extends vertically from a bottom surface portion of the pot stand to support the upper surface part. The plurality of wave suppressing plates extends from the inner wall surface toward a periphery.

In further aspect of the present disclosure, the receiving tray may store water flowing down from the hole of the upper surface part. The receiving tray further includes a second wave suppressing plate that is provided in a gap between the plurality of wave suppressing plates in the take-out direction. The second wave suppressing plate includes a free end at an end having a curved surface which extends toward a direction opposite to the take-out direction in a plan view so that the wave suppressing plates and the second wave suppressing plate form a zigzag water path.

The second wave suppressing plate extends from the side wall surface of the main body.

The water drained from the pot falls into the body part through the hole of the pot stand and is received in the tray. When the water received in the tray is full, the tray is pulled out. When pulling out the tray, the reaction of the momentum is likely to cause the water in the tray to splash out in a take-out direction of the tray. The wave suppressing plates suppress the water from splashing out, thereby preventing the water from spilling from the tray.

As the material of the "pot stand" and the "receiving tray for pot stand", natural wood, plywood, synthetic resin, ceramics, metals such as stainless steel, etc. may be adopted.

The "pot stand" receives the water drained from the pot. The structure of the "pot stand" may be a drawer structure that receives the "receiving tray" like a drawer in the "opening", or a structure in which the "receiving tray" is mounted in the "opening".

The "upper surface part" has a hole for flowing down drained water. The upper surface part may be a flat surface or a curved surface, and preferably has a downward inclination toward an outer circumference of the hole between an outer periphery of the upper surface part and the outer circumference of the hole. The inclination of the upper surface part may start from the outer periphery of the upper surface part or a part of the upper surface part may be inclined from its middle portion, and the position of the inclination is not limited.

The "hole" may have an appropriate shape such as a round hole or a square hole.

The "opening" is comprised of a void and a surface that partitions the void. The tray is placed in the void. The drained water from the pot passes through the hole of the upper surface part and is reserved in the tray.

Advantageous Effects

According to the first aspect of the present disclosure of, the wave suppressing plates are provided on the bottom surface of the main body. This prevents water from spilling from the tray with the wave suppressing plates when the tray is pulled out from the pot stand. The plurality of wave suppressing plates are erected at an interval in the predetermined direction. A resistance force for attenuating waves can be adapted in stages. The end portion of the wave suppressing plate has a curved surface. This turns around the water, thereby enhancing the wave suppressing effect.

According to the second aspect of the present disclosure, the wave suppressing plates are arranged to be inclined with respect to the take-out direction. This more effectively provides a resistance force for attenuating the waves in stages.

According to the third aspect of the present disclosure the inner wall surface is provided in the middle portion, and the plurality of wave suppressing members extend from the inner wall surface toward the periphery, so that a gap is formed between the inner wall surface and the outer periphery of the tray. This turns around the water, thereby enhancing the wave suppressing effect.

According to the fourth aspect of the disclosure, the second wave suppressing plate extending from the side wall surface of the main body is provided in the gap of the plurality of wave suppressing plates in the predetermined direction. This flows the water in a zigzag manner, thereby quickly attenuating the waves.

DESCRIPTION OF EMBODIMENT

Figure 1:
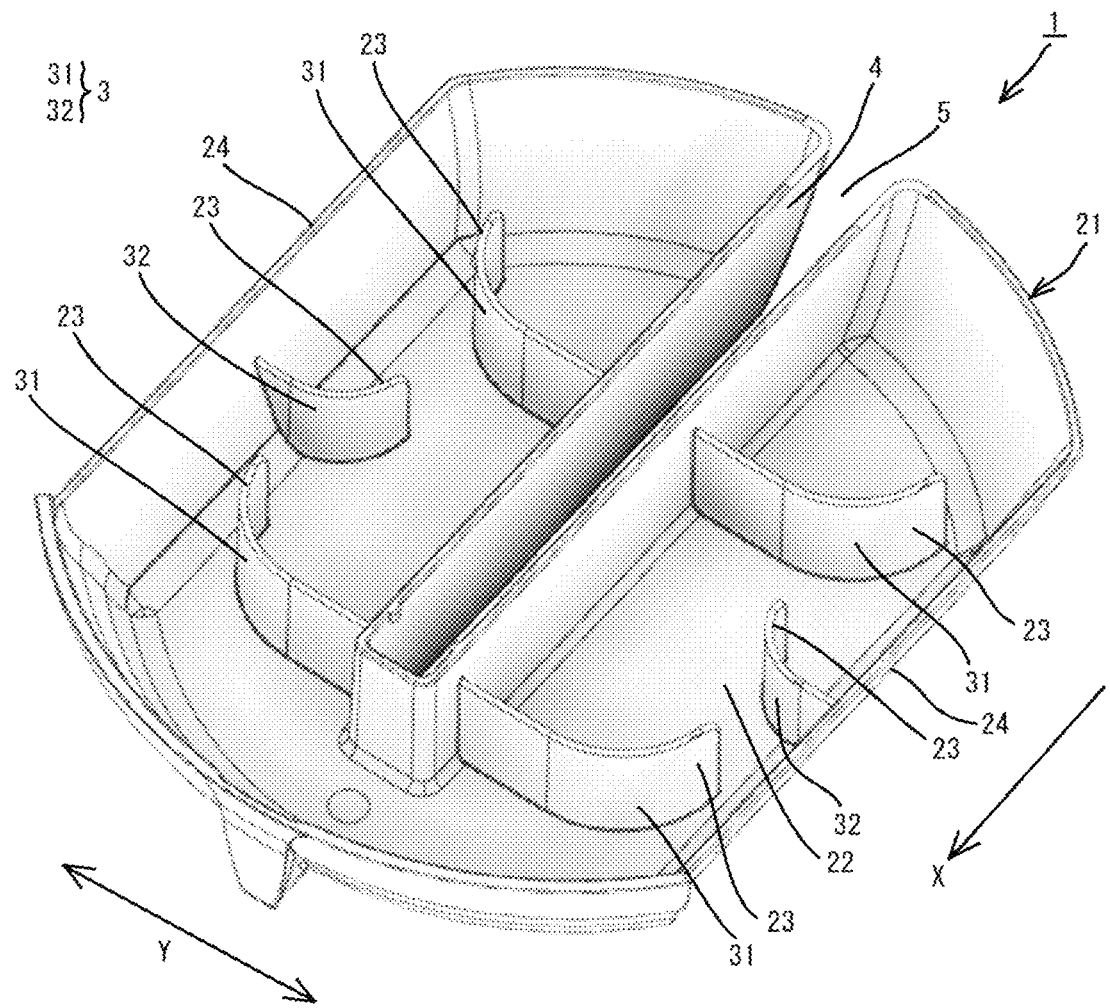
FIG. 1 is a perspective view of a tray according to a first embodiment of the present disclosure.
Figure 2:
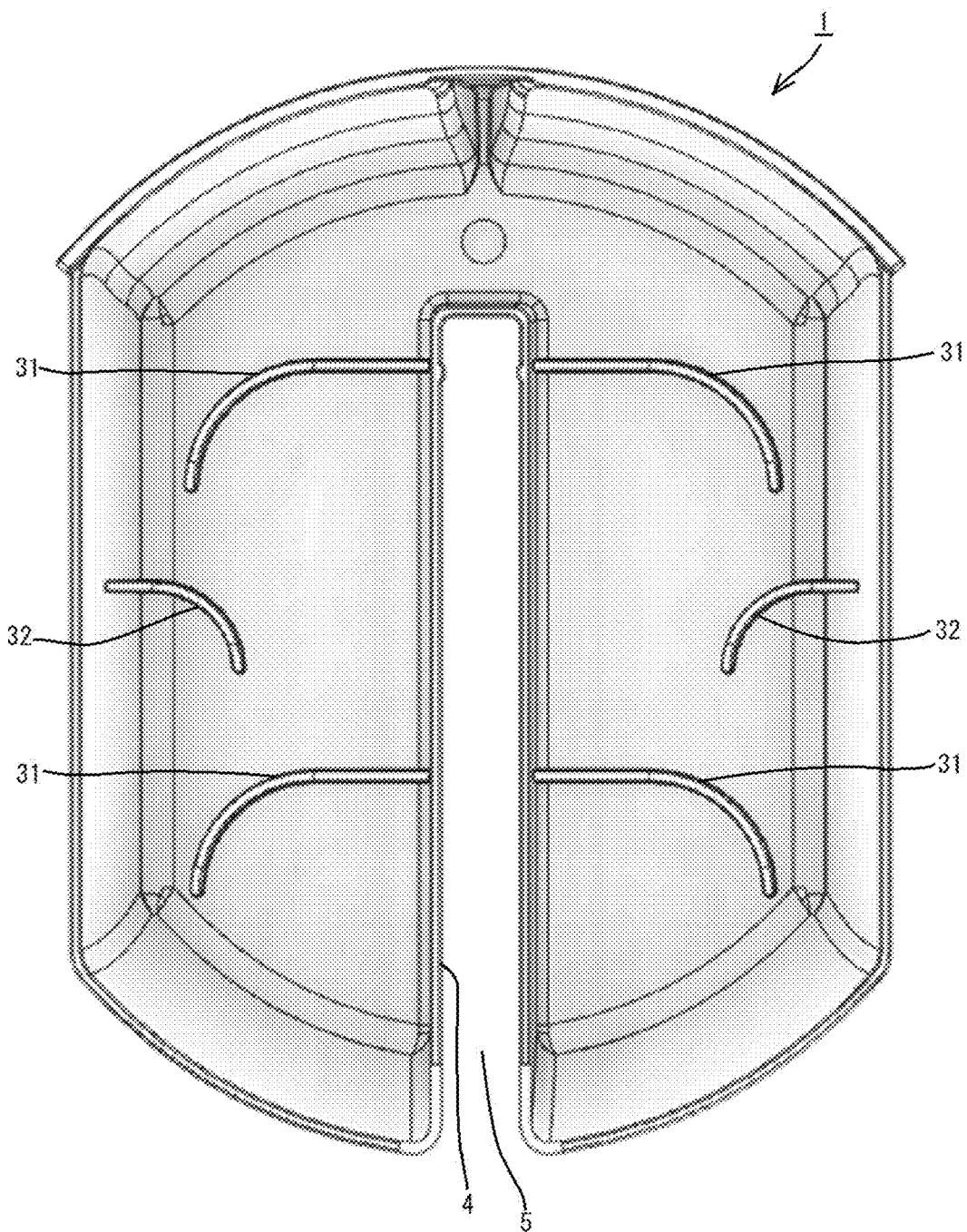
FIG. 2 is a plan view of the same.
Figure 3:
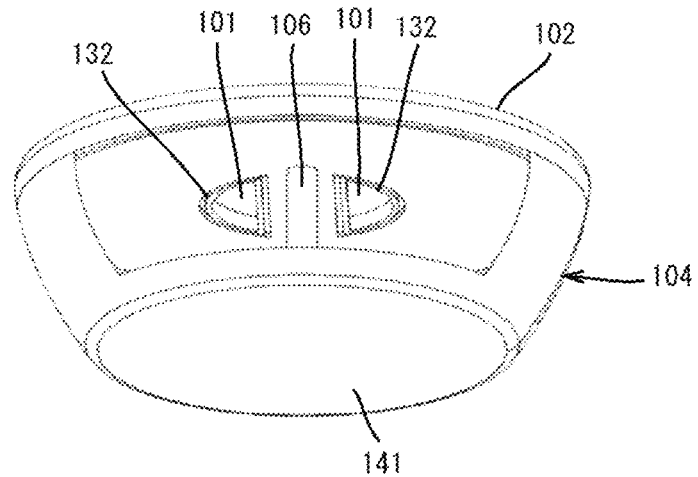
FIG. 3(a) is a perspective view of a pot stand of the first embodiment of the present disclosure with the tray removed.
FIG. 3(b) is a perspective view of the same from another angle.
Figure 3:
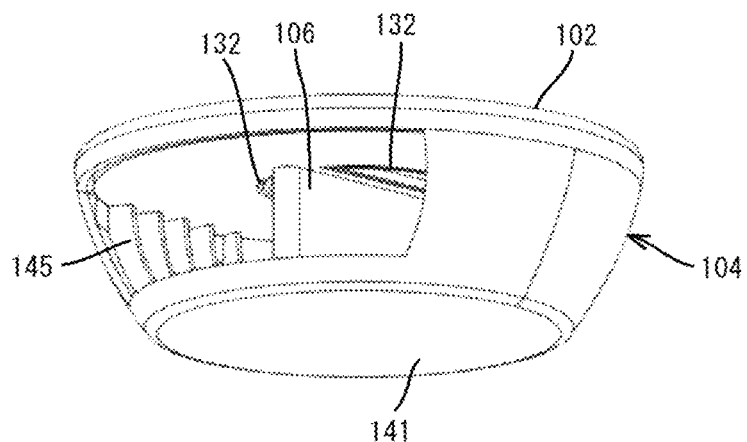
Figure 4:
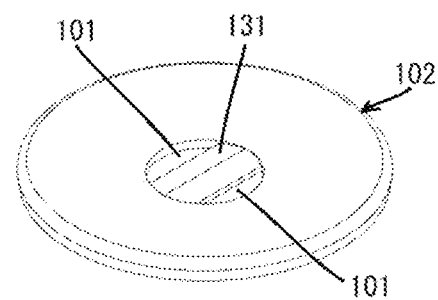
FIG. 4(a) and FIG. 4(b) are perspective views of an upper surface part.
FIG. 4(c) is a rear side view of the upper surface part.
Figure 4:
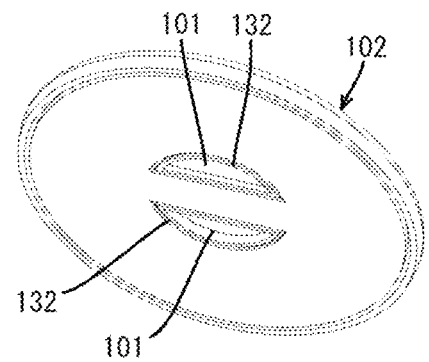
Figure 4:
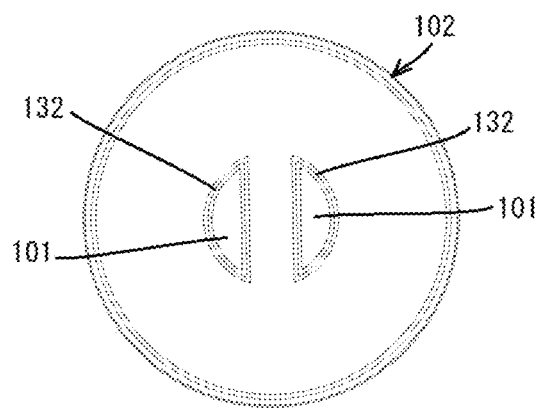
Figure 5:
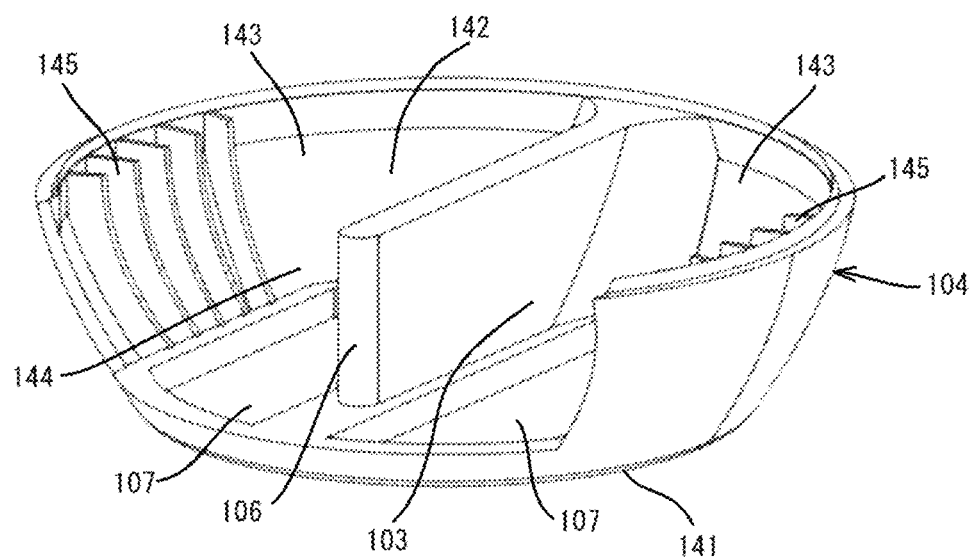
FIG. 5 is a perspective view of a body part.
Figure 6:
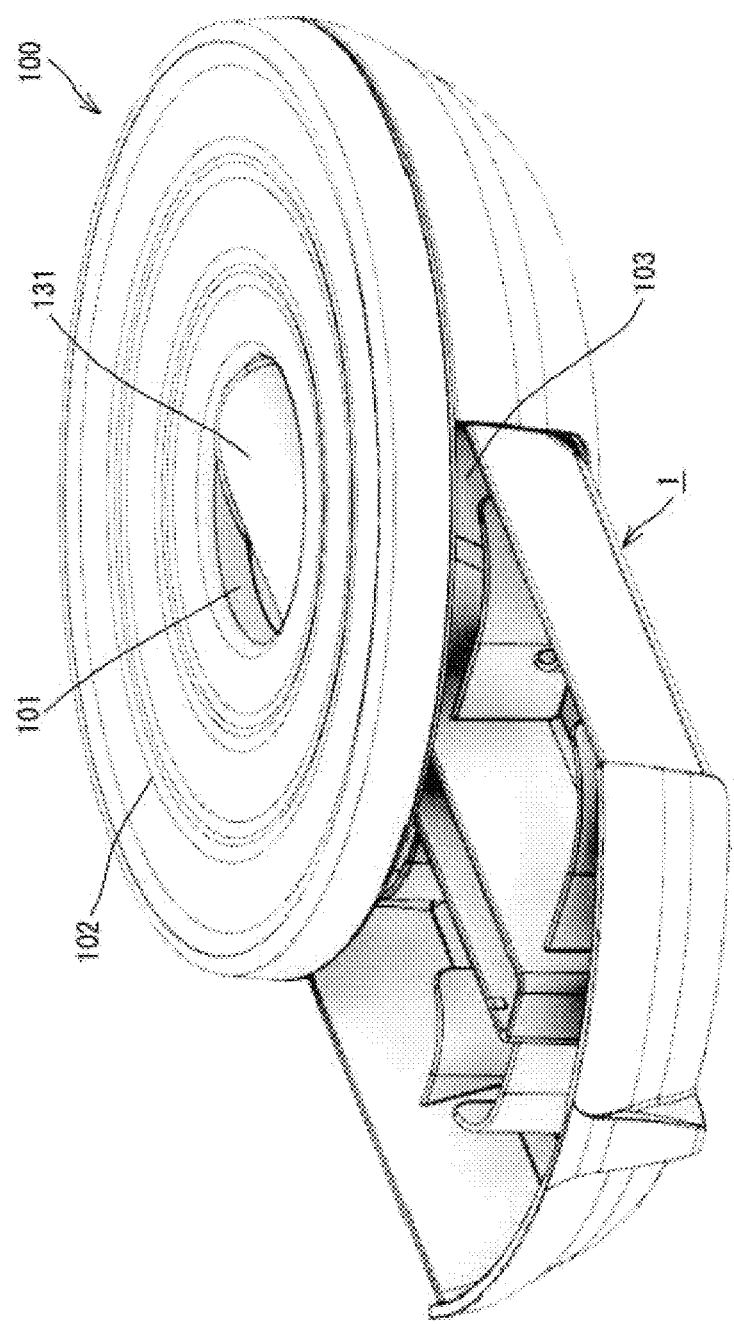
FIG. 6 is a perspective view showing a usage state 1 in which the tray is pulled out.
Figure 7:
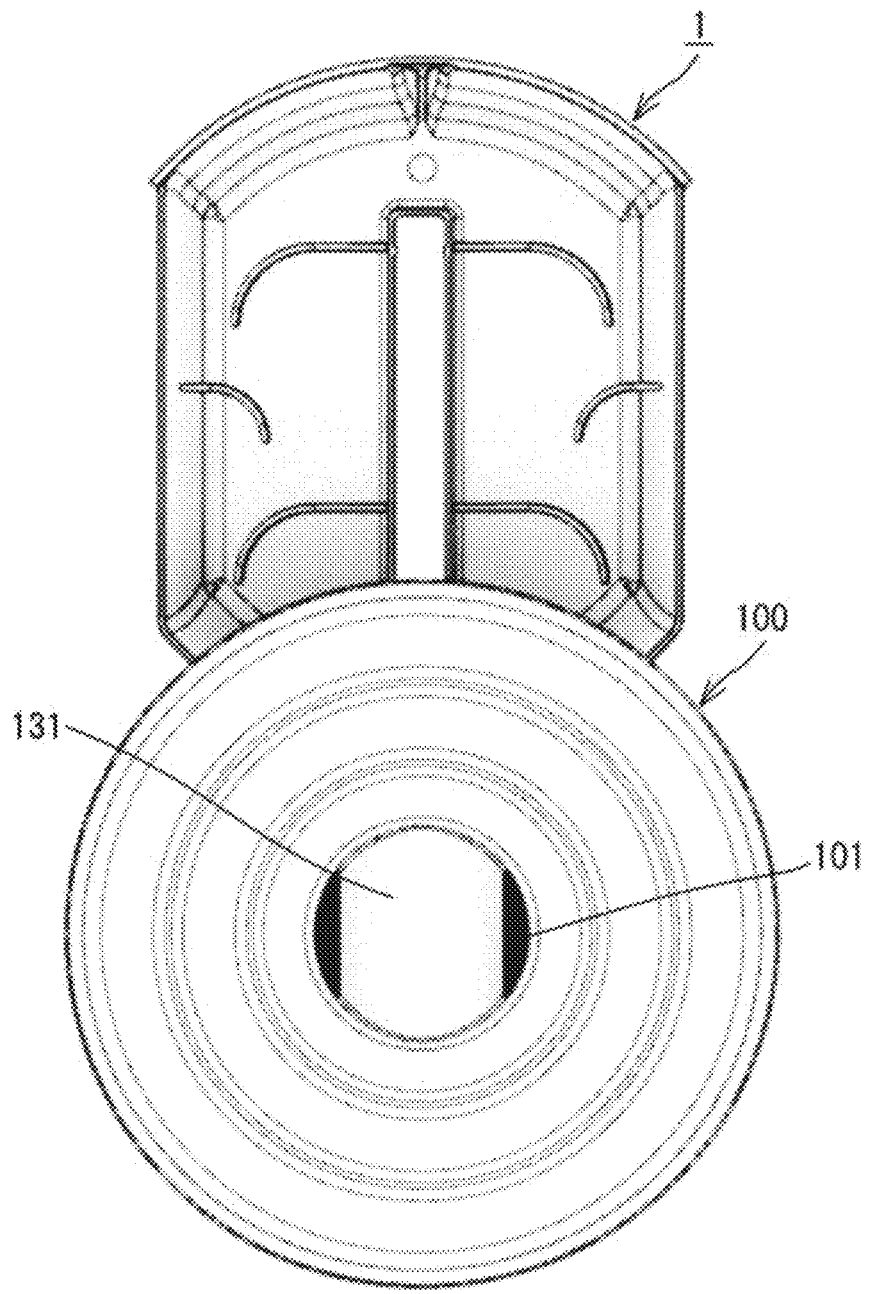
FIG. 7 is a plan view of the same.
Figure 8:
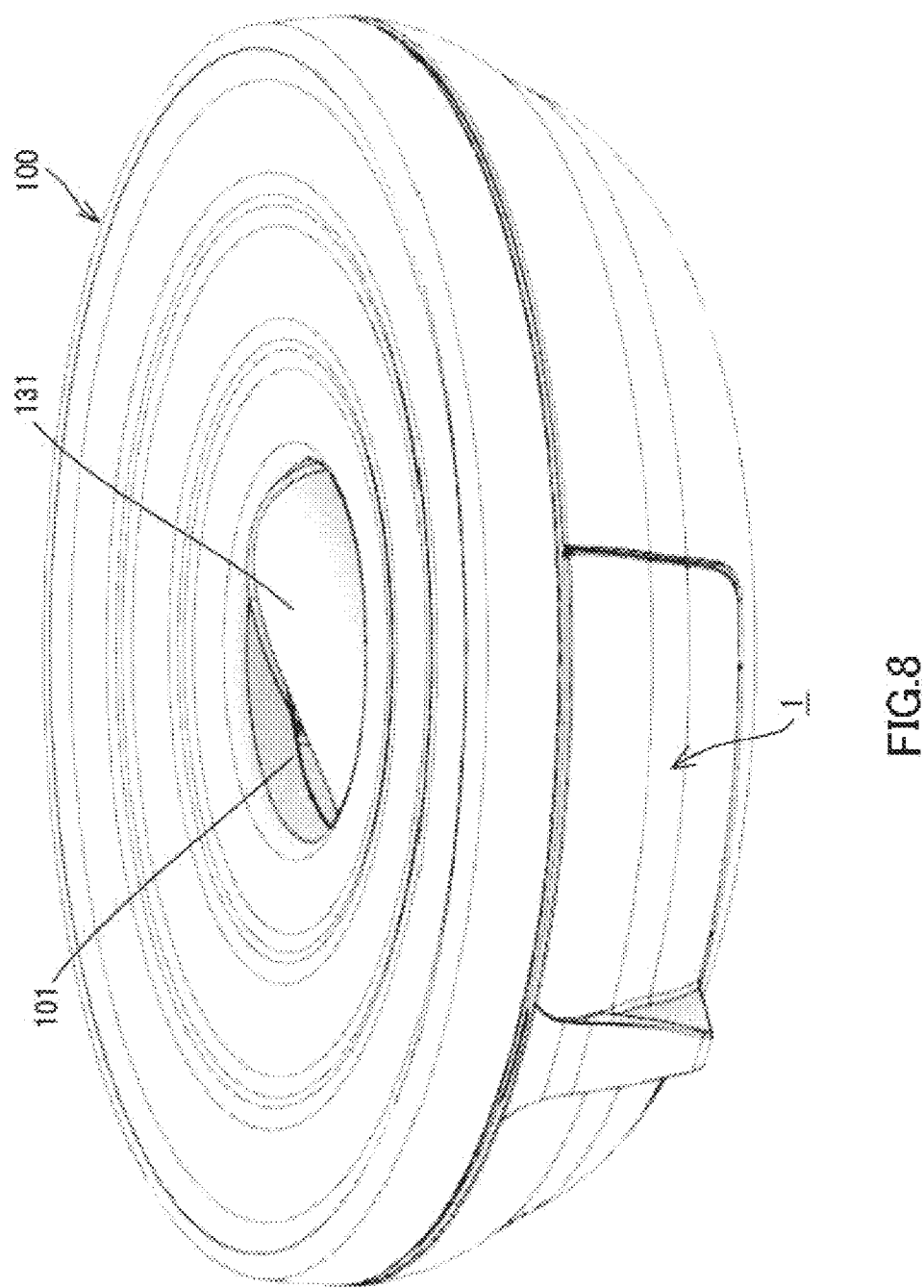
FIG. 8 is a perspective view showing a usage state 2 in which the tray is received in the pot stand.

A tray 1 of a preferred embodiment 1 of the present disclosure will be described with reference to FIGS. 1 to 9.

The tray 1 is a component that receives water drained from a pot stand 100 including an upper surface part 102 with a hole 101 and an opening 103. The tray 1 has a main body 21 that is removable from the opening 103 in a predetermined direction X and a plurality (six in the figure) of wave suppressing members 3 that extend in a width direction Y and are arranged at intervals in a predetermined direction X on a bottom surface 22 of the main body 21. The configuration now will be described.

Each of the wave suppressing members 3 is a plate-shaped member. An end of each of the wave suppressing members 3 has a curved surface 23. The plurality of wave suppressing members 3 are arranged at intervals in the predetermined direction X. In this embodiment, the predetermined direction X is a longitudinal direction of the tray 1.

The plurality of wave suppressing members 3 include first wave suppressing members 31 and second wave suppressing members 32 that extend inward from a side wall surface 24 of the main body 21 in a gap between the first wave suppressing members 31 in the predetermined direction X.

The main body 21 includes an inner wall surface 4 having a U-shape in a plan view in the middle portion to form a groove 5, and the plurality of first wave suppressing members 31 extend from the U-shaped inner wall surface 4 that is located in the middle portion of the main body 21.

A material of the tray 1 and the pot stand 100 is a synthetic resin.

The pot stand 100 receives water drained from a pot P. The structure of the pot stand 100 has a drawer structure that receives the tray 1 like a drawer in the opening 103.

The upper surface part 102 has the hole 101 through which drained water flows downward. The upper surface part 102 may be a flat surface or a curved surface, and preferably has a downward inclination toward an outer circumference of the hole 101 between the outer periphery and the outer circumference of the hole 101. The inclination of the upper surface part 102 may start from the outer periphery of the upper surface part 102, or a part of the tray may be inclined from its middle portion, and the position of the inclination is not limited.

The hole 101 has a shape surrounded by an arc and a chord, but another shape, for example, a square hole or the like, may be adopted as appropriate.

The opening 103 is comprised of a void and a surface that partitions the void. The tray 1 is placed in the void. The water drained from the pot P passes through the hole 101 of the upper surface part 102 and is received in the tray 1.

As shown in FIGS. 3 to 6, the pot stand 100 includes a body part 104, the above-specified tray 1 and a wall-shaped supporting portion 106. The body part 104 has a bottom surface portion 141, a side surface portion 142, and a space 143 in which an upper side is open. The opening 103 is provided in a part of the side surface portion 142. Ribs are provided inside the body part 104 to mount the upper surface part 102. The tray 1 is slideable laterally with respect to the opening 103 and is received in the space 143. The supporting portion 106 extends from the bottom surface portion 141 to receive a load.

The upper surface part 102 is a cone-shaped curved surface. The upper surface part 102 is inclined downward inwardly from the outer periphery of the upper surface part 102 to the outer circumference of the hole 101. The degree of the inclination of the upper surface part 102 is preferably 2 to 6 degrees in consideration of discharge efficiency and the like.

A beam 131 is provided laterally to divide the hole of the upper surface part 102 into two holes 101. A center of the beam 131 is raised along the plate direction. The beam 131 is arranged to cover the supporting portion 106. The beam 131 is inclined downward from the highest position toward the hole 101 so that drained water is not retained on its upper surface. A semicircular circumferential groove 132 is provided on rear sides of the upper surface part 102 and the beam 131. The circumferential groove 132 prevents the drained water from flowing out of the tray 1 along the rear surface of the upper surface part 102 to effectively fall the drained water into the tray 1.

The body part 104 has a shape corresponding to a sphere shape from which a lower end portion and an upper portion are removed.

The body part 104 may be used individually, or may take various forms including a part of furniture such as cabinets or bookcases and a form equipped with casters The supporting portion 106 is located inside the body part 104 and extends vertically upward from a middle portion of the bottom surface portion 141. The supporting portion 106 is configured to support the upper surface part 102. The supporting portion 106 is a rib having a dimension in a thickness direction, a width direction, and a height direction. The supporting portion 106 has an upper surface that receives a load of the pot P through the upper surface part 102. The thickness of the supporting portion 106 is thicker than that of the side surface portion 142. This enhances the load bearing performance.

The groove 5 of the tray 1 is formed to correspond to the shape of the supporting portion 106. The groove 5 and the supporting portion 106 have a similar shape and can be fitted to each other. The groove 5 is formed by bending a wall of the tray 1 inwardly. This enables receiving of the tray 1 in the body part 104 without interfering with the supporting portion 106 and also enables excellent sliding movement of the tray 1. A handle is mounted on a front surface of the tray 1.

The single supporting portion 106 is not limitedly provided but two or more supporting portions 106 may be provided depending on the design. In such cases, the shape of the tray 1 must be designed so not to interfere with the supporting portion 106.

The bottom surface portion 141 includes a recessed groove 107. The recessed groove 107 is formed to be recessed more than the upper surface of the bottom surface portion 141. The recessed groove 107 is provided in the body part 104 to supplementary reserve the drained water when the tray is taken out for drain disposal.

Figure 9:
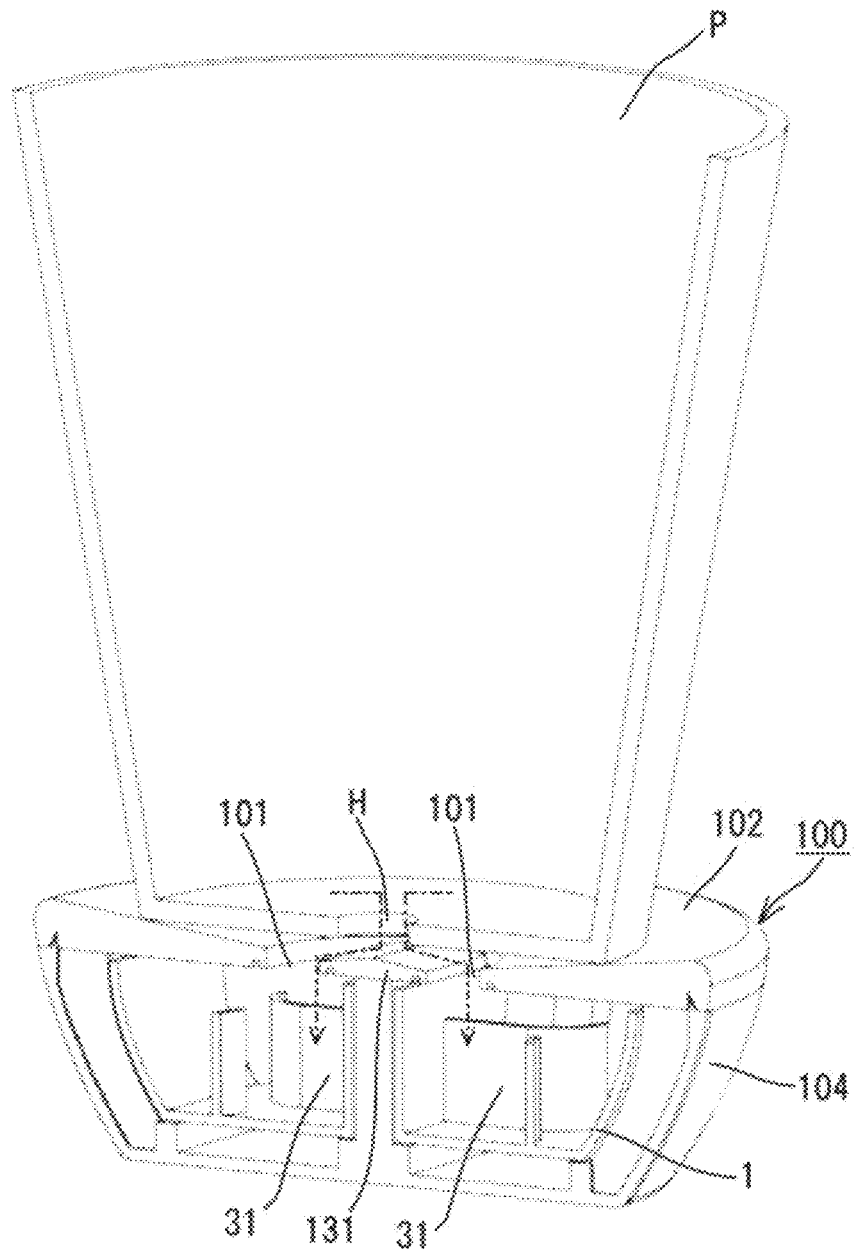
FIG. 9 is a cross-sectional view of a reference usage state of the tray according to the first embodiment of the present disclosure.

The following describes a using method of the tray 1 and the pot stand 100. Chained lines in FIG. 9 show flows of the drained water. The water drained from a bottom hole H of the pot P falls on the surface of the upper surface part 102 down into the tray 1 that is positioned in the body part 104 through the hole 101 of the upper surface part 102, and reserved in the tray 1. The upper surface part 102 has an inclination to avoid the drained water left thereon.

As shown in FIG. 9, the pot P typically includes the pot bottom hole H. The pot stand 100 can be adopted to pots having various types of holes including the pot P with slits on its bottom periphery (not shown). The pot stand 100 is adaptable to various shapes, weight or drain holes of pots to the extent that the bottom surfaces of the pot P lie within the outer periphery of the upper surface part 102.

When the pot P is positioned on the upper surface part 102, the load of the pot P applied to the upper surface part 102 is supported by the upper surface of the receiving part 106. The drained water running along the rear surface of the upper surface part 102 is blocked by the circumferential grooves 132 to fall downward. The tray 1 under the rear surface is taken out to throw away the reserved water. When watering the pot P, the water drained from the bottom hole H of the pot P passes the upper surface part 102 into the tray 1 via the beam 131 through the hole 101 and reserved in the tray 1.

The tray 1 which becomes full of reserved water is pulled out. When the tray 1 is pulled out, the water in the tray 1 is likely to splash out in the take-out direction X of the tray 1 due to the reaction of the momentum. The wave suppressing member 3 suppresses the water from splashing out to prevent the water from spilling out of the tray 1. After the water being disposed, the tray 1 is received in its original position.

It is assumed that the drained water is disposed according to the usage including dispose to a wash basin, bucket, ground, etc. In either case, the water is disposed from the tray 1 smoothly without any resistance. In a case that many pots and accordingly many trays 1 are used, it is assumed that the water is temporarily disposed into a bucket. Specifically, the drained water is collected from the trays. The tray 1 may be slanted backward in the predetermined direction X to dispose the drained water. This causes dropping of the drained water basically without turning over the tray. The drained water falling down through the hole 101 spreads over the whole bottom surface 22 to be retained. This improves the convenience and enables easy dry due to the wide surface.

The wave suppressing members 3 are plate shaped. This increases the resistance force that attenuates the movement of the water.

Each wave suppressing member 3 has a curved surface 23 at an end. This causes turning around of the water to improve the wave suppressing effect.

The plurality of wave suppressing members 3 are arranged at intervals in the predetermined direction X. This provides a resistance force that attenuates the waves in stages.

The second wave suppressing member 32 that extends from the side wall surface 24 of the main body 21 is provided in the gap between the plurality of wave suppressing members 3 in the predetermined direction X. This causes the water to flow in a zigzag manner to quickly attenuate the wave.

The plurality of wave suppressing members 3 extend from the inner wall surface 4 that is provided in the middle portion of the main body 21. This improves the strength of the wave suppressing members 3.

The supporting portion 106 receives the load of the pot. This enables receiving of the drained water irrespective of the weight of the pot. This also makes the structure of the tray 1 simple, thereby reducing the manufacturing cost.

The beam 131 divides the water drained from the pot bottom hole H to flow downward. The water leakage along the rear surface of the upper surface part 102 and the supporting portion 106 is prevented by covering the supporting portion 106 with the beam 131 and providing the circumferential groove 132.

The water drained from the pot P is received in the recessed groove 107 when the tray 1 is pulled out from the body part 104. This improves the water storage effect.

The supporting portion 106 is thicker than the side surface portion 142. This improves the load bearing capacity of the supporting portion 106.

The tray 1 is prevented from interfering with the supporting portion 106 and arranged at an appropriate position of the internal space of the body portion 104, resulting in high arrangement efficiency.

Figure 10:
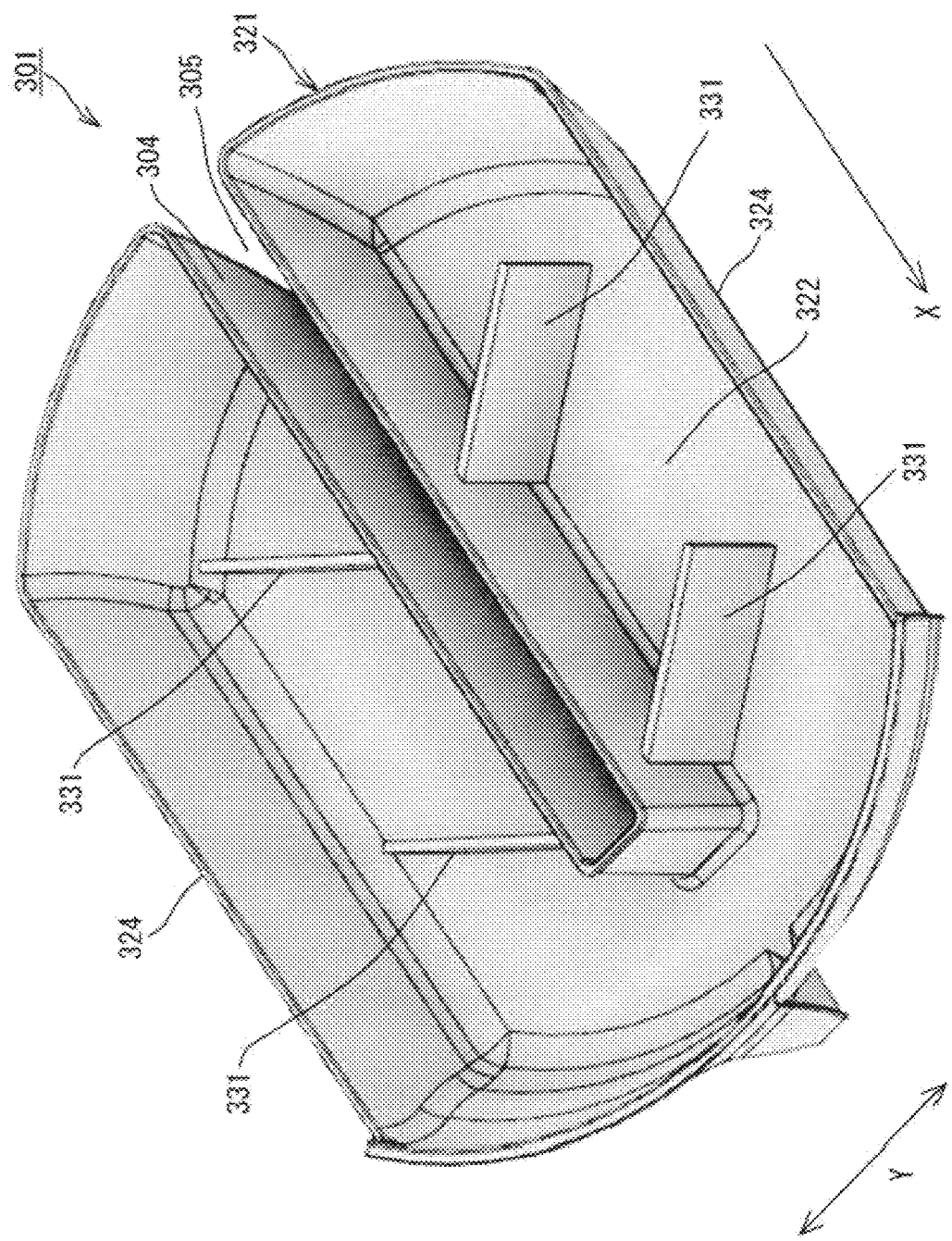
FIG. 10 is a perspective view of a tray according to a second embodiment of the present disclosure.

A tray 301 of a second embodiment of the present disclosure will be described with reference to FIG. 10. The tray 301 is modified in shape and arrangement of the wave suppressing member 3. The description in common with the tray 1 of the first embodiment is referred. Corresponding members are denoted by like reference signs in the 300's. The below mainly describes differences. Each wave suppressing member 331 has a plate-like structure and is inclined at a predetermined angle with respect to the predetermined direction X. The inclination angle may be set appropriately within a predetermined angle range with respect to the predetermined direction X. For example, the angle can be set in the range of 2 to 178 degrees. One end of the wave suppressing member 331 extends from an inner wall surface 304, and the other end is a free end. A gap is provided between the free end and a side wall surface 324. Two pair of the wave suppressing members 331 are arranged laterally symmetrically at an interval. The wave suppressing members 331 may not be arranged symmetrically, but may be arranged alternatively, for example. The wave suppressing members 331 are slanted upward but may alternatively be slanted downward. The wave suppressing members 331 basically have the same effect as the wave suppressing member 3.

Figure 11:
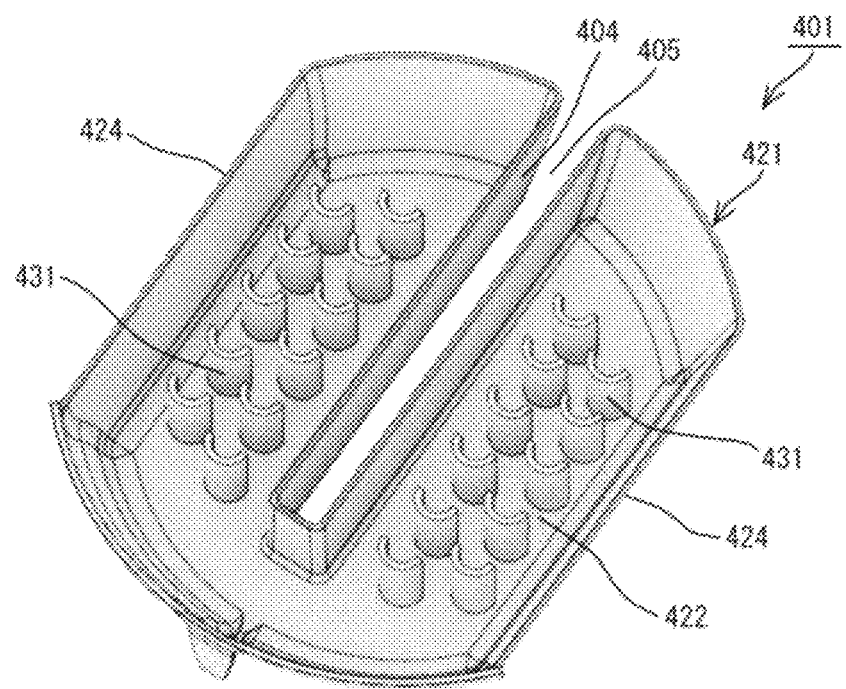
FIG. 11 is a perspective view of a tray according to a third embodiment of the present disclosure.

A tray 401 of a third embodiment of the present disclosure will be described with reference to FIG. 11. The tray 401 is modified in shape and arrangement of the wave suppressing members 3 and 331. The description of in common with the tray 1 of the first and second embodiments will be referred. Corresponding members are denoted by like reference signs in the 400's. The below mainly describes differences. Each wave suppressing member 431 has a U-shape or a half-tubular shape that is divided in half along an axial direction with respect to the predetermined direction X (in FIG. 11, a half cylindrical shape divided along the axial direction). The plurality of wave suppressing members 431 are arranged in a row in the predetermined direction X. The shape and arrangement of the wave suppressing members 431 may be modified appropriately to the extent that the wave suppressing function is ensured. The wave suppressing members 431 basically have the same effects as the wave suppressing members 3 and 331.

Figure 12:
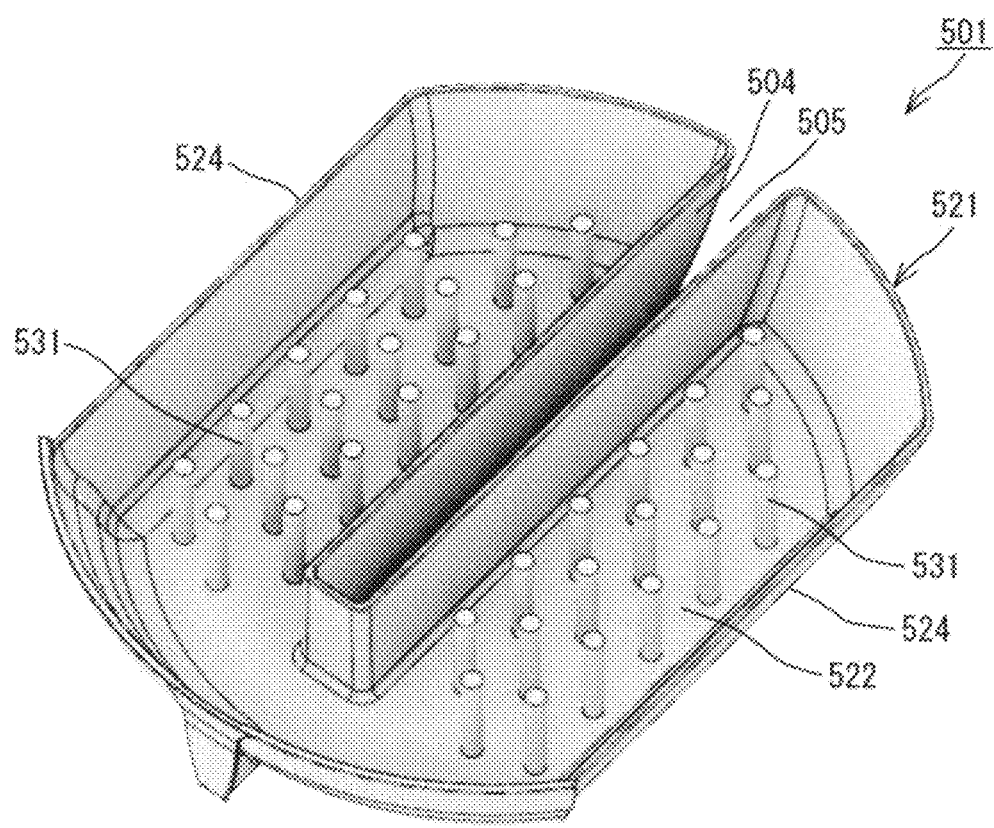
FIG. 12 is a perspective view of a tray according to a fourth embodiment of the present disclosure.

A tray 501 of a fourth embodiment of the present disclosure will be described with reference to FIG. 12. The tray 501 is modified in shape and arrangement of the wave suppressing members 3, 331 and 431. The description in common with the trays 1, 301, 401 of the first to third embodiments is referred. Corresponding members are denoted by like reference sings in the 500's. The below mainly describes differences. Each wave suppressing member 531 has a pillar or cylindrical shape with respect to the predetermined direction X and a plurality of the wave suppressing members 531 are erected at intervals in the predetermined direction X. The shape and arrangement of the wave suppressing members 531 may be appropriately modified to the extent that the wave suppressing function is ensured. The wave suppressing members 531 basically have the same effects as the wave suppressing members 3, 331 and 431.

Figure 13:
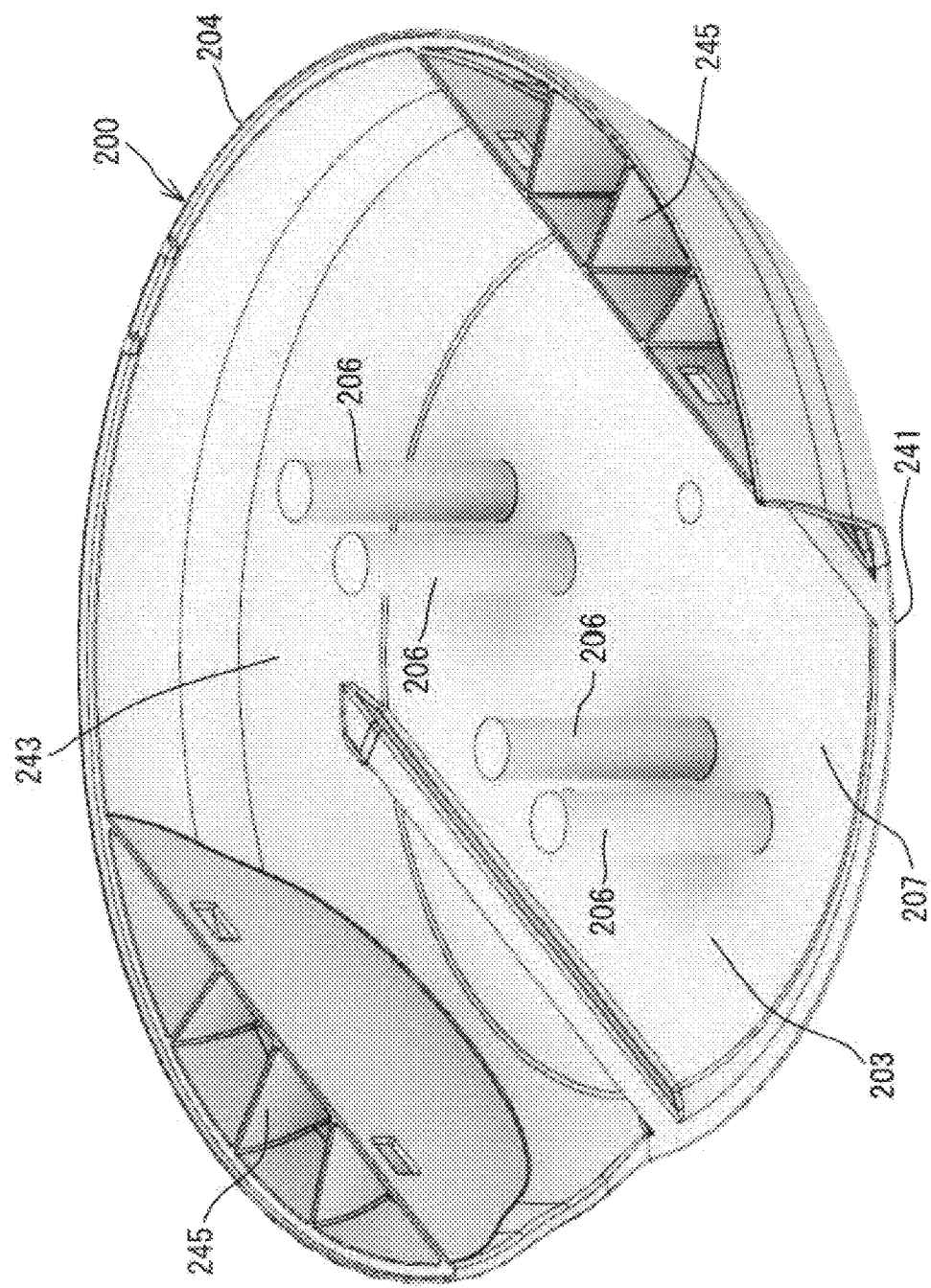
FIG. 13 is a perspective view of a modified example of the body part of the pot stand that is adapted to receive the trays of the first to fourth embodiments of the present disclosure.

A modified example of the body part of the pot stand 100 that receives the trays 1, 301, 401, and 501 of the first to fourth embodiments of the present disclosure will be described with reference to FIG. 13. The supporting portion 106 that is provided at the middle portion of the bottom surface portion 141 of the pot stand 100 in the first embodiment has a plate shape, but in the modified example shown in FIG. 13, a plurality of pillar-shaped supporting portions 206 are alternatively adopted. The load receiving members 206 are erected with a gap in the predetermined direction X. The supporting portions 206 has a pillar shape the cross-sectional shape of which may be appropriately selected from a round shape, a polygonal shape, and the like, and may be a tube. The configuration common to the pot stand 100 of the first embodiment is denoted with like reference sings in the 200's and the description thereof is referred. The supporting portions 206 have basically the same effects as the supporting portion 106.

Figure 14:
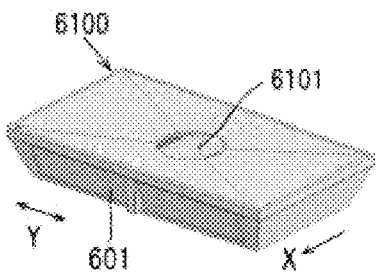
FIG. 14(a) to FIG. 14(d) are perspective views of a tray and a pot stand according to a fifth embodiment of the present disclosure.
Figure 14:
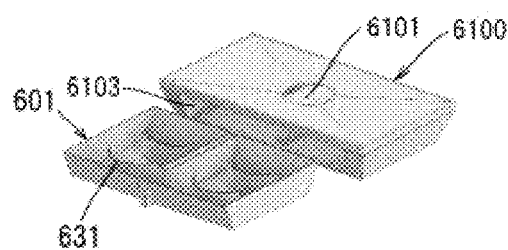
Figure 14:
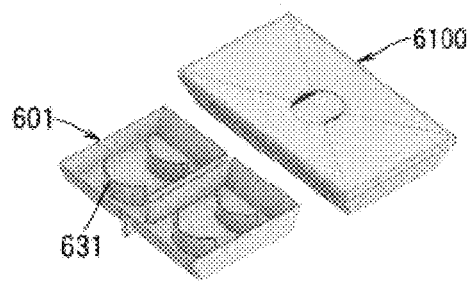
Figure 14:
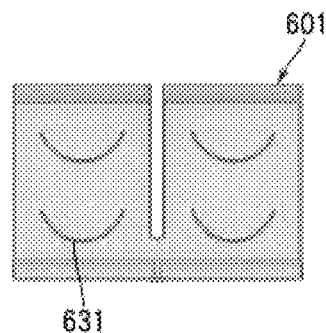
Figure 15:
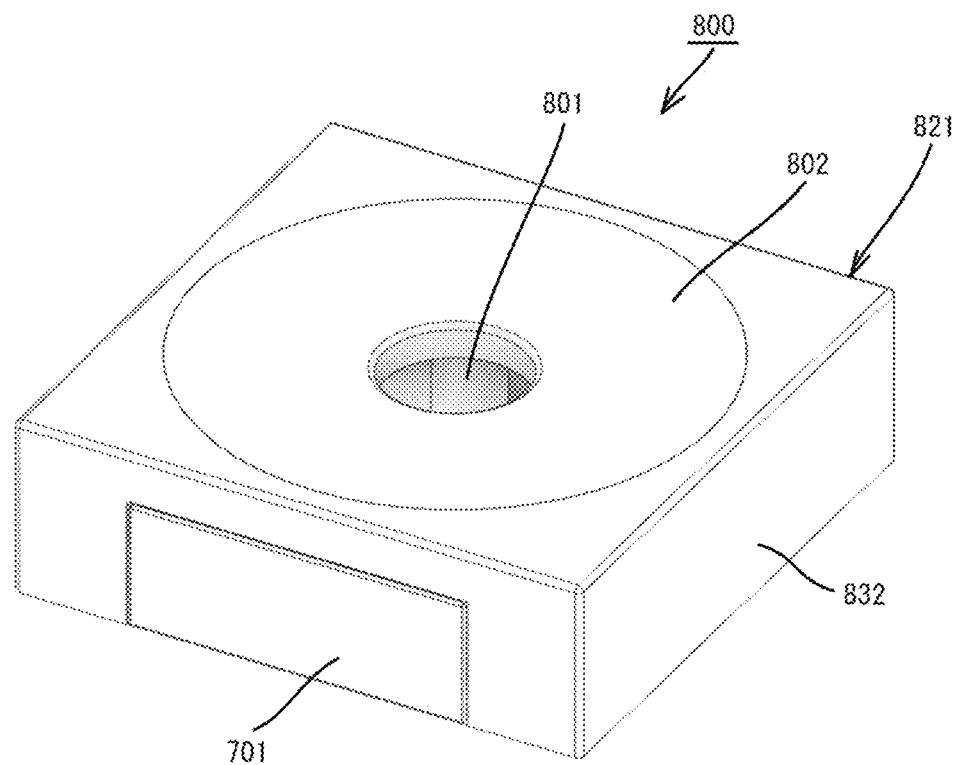
FIG. 15 is a perspective view of a tray and a pot stand according to a sixth embodiment of the present disclosure.

A tray 601 and a pot stand 6100 according to a fifth embodiment of the present disclosure will be described with reference to FIG. 14. The description in common with the trays 1, 301, 401, and 501 of the first to fourth embodiments are referred. Corresponding members are denoted with like reference signs in the 600's. The description in common with the pot stand 100 is referred. Corresponding members are denoted with like reference signs in the 6000's. The below mainly describes differences. The tray 601 and the pot stand 6100 are square, with the X direction set to the lateral direction and the Y direction set to the longitudinal direction.

The tray 601 and the pot stand 6100 are horizontally long in the Y direction. The wave suppressing members 631 of the tray 601 are modified in shape and arrangement from the wave suppressing members 431 in FIG. 11 and the number of the wave suppressing members 631 is reduced.

A tray 701 and a pot stand 800 according to a sixth embodiment of the present disclosure will be described with reference to FIGS. 15 to 18. The tray 701 has a reservoir tray 871 having a wave suppressing member 809, and a bottom surface portion 872 that is arranged below the reservoir tray 871. The bottom surface portion 872 includes a protruding piece 873, a guide member 874 and a shallowly recessed groove 875. The protruding piece 873 protrudes upward and is engaged with an engaging hole of a first side wall 831. The guide member 874 is an angular U-shaped (or frame-shaped) rib and is adapted to guide the reservoir tray 871. The guide member 874 is fixed to the bottom surface. The bottom surface portion 872 is disposed in the tray 701 to supplementary receive the water in the temporary absence of the reservoir tray 871 when the reservoir tray 871 is pulled out for disposition of the water reserved in the reservoir tray 871, and to reserve the water that is spilled from the reservoir tray 871 when the reservoir tray 871 is received in the body part 821.

The body part 821 receives the load of the pot P with a simple structure, enhances the load-bearing performance when the pot P is placed, avoids an increase in thickness and dimensions, simplifies the structure, prevents bending of a portion that receives the load, adopts to pots P of various weights, and reduces manufacturing costs such as mold costs.

Figure 16:
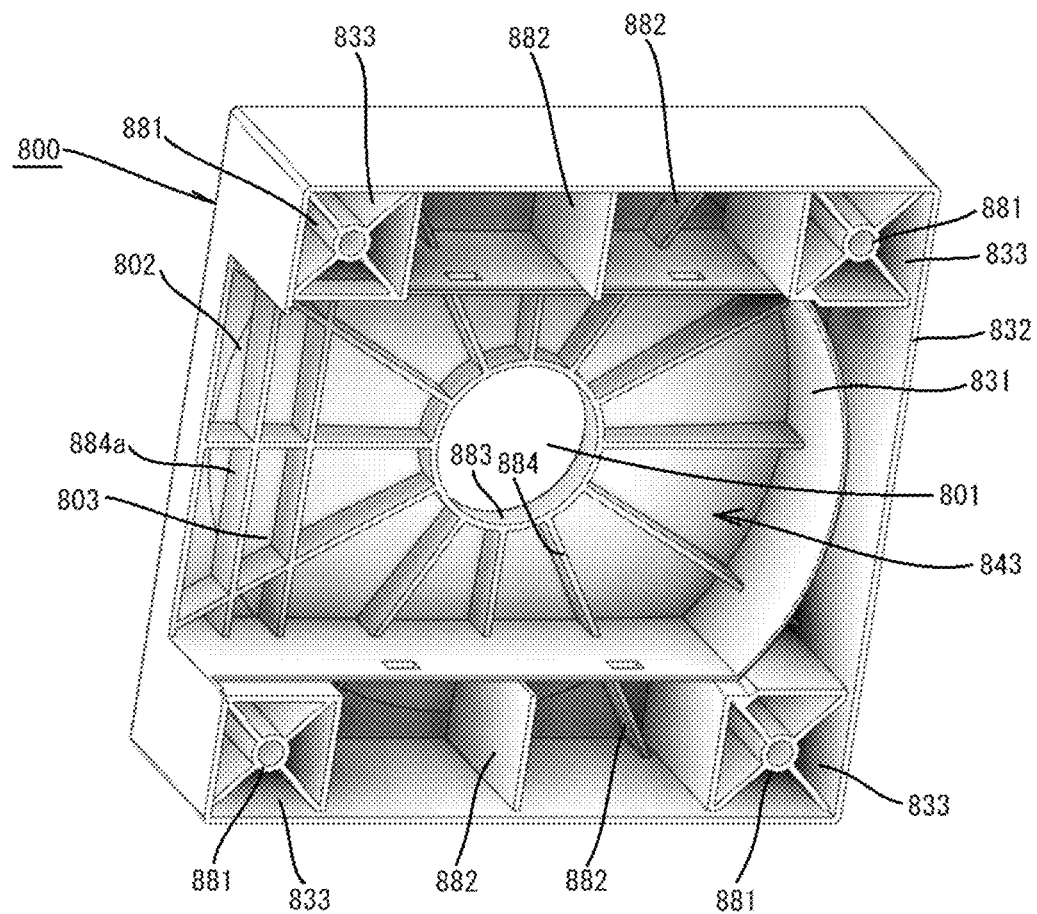
FIG. 16 is a perspective view of the pot stand from a rear side.
Figure 17:
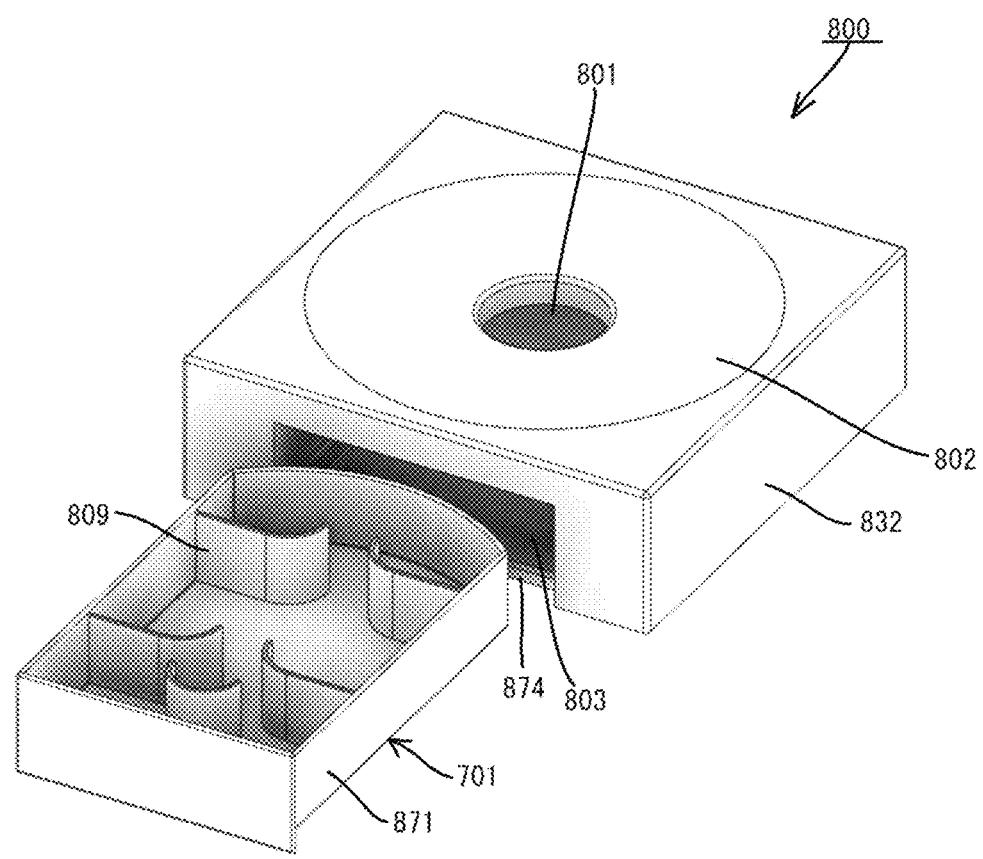
FIG. 17 is a perspective view of the pot stand un which the tray is pulled out.
Figure 18:
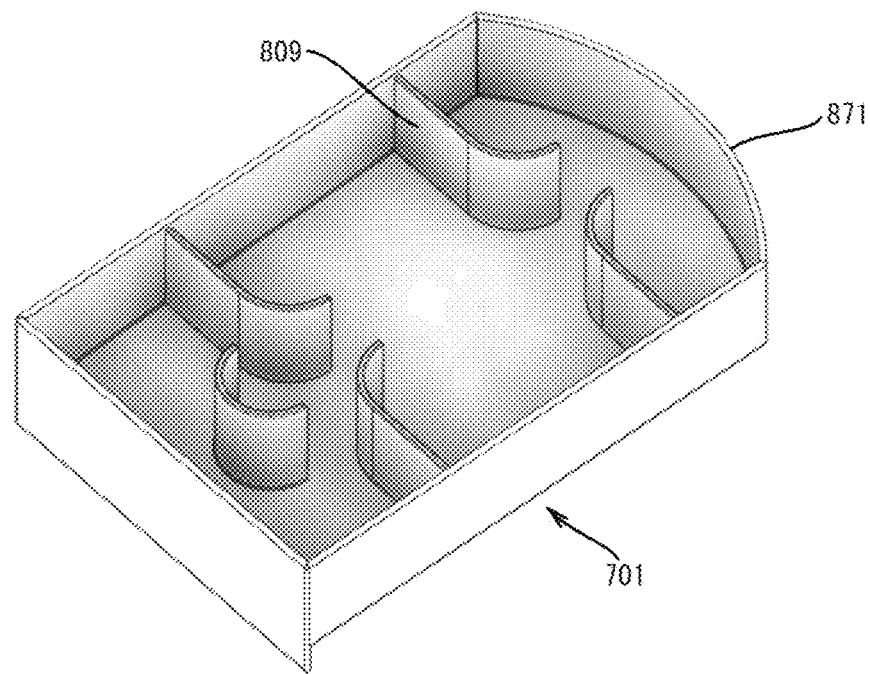
FIG. 18(a) is a perspective view of the tray.
FIG. 18(b) is a perspective view of a bottom surface.
Figure 18:
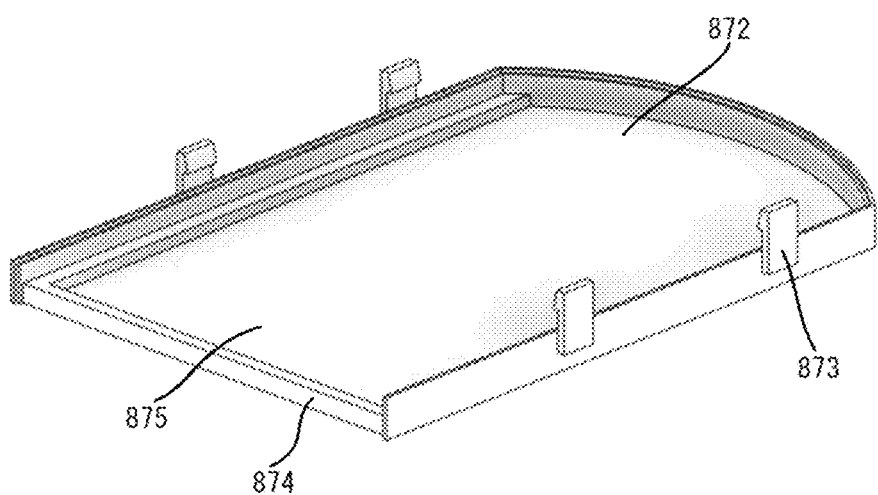

As shown in FIG. 16, the pot stand 800 has a plate-shaped rib 808 that extends to an internal space 843 from a rear surface of an upper surface part 802 of a body part 821.

As shown in FIG. 16, a hole 801 is circular, and the rib 808 includes a circular rib 883 that extends downward from a circumference of the hole 801 and a plurality of radial ribs 884 that extends radially outward from the circular rib 883 to the first side surface portion 831. This improves the load bearing capacity.

As shown in FIG. 16, a U-shaped or angular U-shaped first side surface portion 831 and a second side surface portion 832 are included. The first side surface portion 831 is located in a space 843 and has an opening 803. The second side surface portion 832 is arranged to surround the first side surface portion 831. The second side surface portion 832 is square and has a left side surface, a right side surface, a front surface, and a rear surface. The first side surface portion 831 and the second side surface portion 832 form a double wall structure.

Square tubular pillars 833 are provided at four corners of the second side surface portion 832. Lower end openings of the pillars 833 are adapted to attach wheels, casters, legs, or the like, or fix to a table or the like via a fixture. The position, number, or structure of the pillars 833 may be changed as appropriate.

As shown in FIG. 16, the opening 803 serves as an exit of the space 843 and is partitioned by a structure for partitioning the space 843. The opening 803 is square.

The upper surface part 802 and side surface portions 831 and 832 of body part 821 are formed by integral resin molding. The body part 821 may be used individually, and may take various forms including a part of furniture such as cabinets or bookcases and a form equipped with casters. The variation of the shapes of the body part 821 may be adopted appropriately. For example, a support structure (not shown) may be provided in the central portion of the body part 821 to enhance the load bearing performance.

The upper surface part 802 is arranged horizontally and the side surface portions 831 and 832 are arranged vertically downward from the periphery of the upper surface part 802. This ensures the load bearing performance with a simple structure.

As shown in FIG. 16, the rib 808 includes a central tube and an internal rib 881 that extends in a cross direction from the central tube in the wall of the pillar 833. The rib 808 is comprised of a plurality of ribs having different shapes and structures, and includes a connecting rib 882 that connects the first side surface portion 831 and the second side surface portion 832, the circular rib 883 that extends downward from the circumference of the round hole 801, and the radial ribs 884 that extends radially from the circular rib 883 to the inner side of the first side surface portion 831. Reinforcing rib 884a may be provided in a manner of intersecting with the radial ribs 884.

The heights of the circular rib 883 and the radial ribs 884 are smaller than the heights of the first side surface portion 831 and the second side surface portion 832 in the range of 10 to 40%, for example.

The number, position, thickness, height, width, length, or fixing angle of the rib 808 may be changed according to required load capacity. The thickness of the upper surface part 802 may also be changed as appropriate. It is also envisaged to place a fairly large pot, which can be dealt with by changing the number, thickness, density, and length of the rib 808. To increase the strength, addition of ribs in the integral molding is contemplated, which increases the cost for a mold. In such a case, however, it may not be necessary to attach other parts or reinforce with other materials (for example, aluminum) for some raw materials thereby finally suppressing the cost.

The present disclosure is not limited to the above embodiments. Various modifications, changes and additions may be made without departing from a scope of the technical ideas of the present disclosure. Modifications and equivalents thereof are also included in the technical scope of the present disclosure. The shape of the tray 1 is not limited to the embodiments but may take various shapes including round and square. The structures of the pot stand 100 and the pot P is not limited to the embodiments. The trays 1, 601 may be just located inside the openings 103, 6103 without having a drawer structure that receives the trays 1, 601 in the openings 103, 6103. The openings 103, 6103 is not limited to open in one direction but may open in both directions and may be a through hole, for example.

REFERENCE NUMERALS 1 tray
21 main body
22 bottom surface
X predetermined direction
Y width direction
3 wave suppressing member
23 curved surface
24 side wall surface
31 first wave suppressing member
32 second wave suppressing member
4 inner wall surface
5 groove
100 pot stand
101 hole
102 upper surface part 103 opening
104 body part
106 supporting portion
107 recessed groove
131 beam
132 circumferential groove
141 bottom surface portion
142 side surface portion
143 space
145 rib
P pot

The invention claimed is:

1. A receiving tray for a pot stand, the pot stand including an upper surface part having a hole and a side surface portion having an opening, the receiving tray being retractable with respect to the opening, the receiving tray comprising:
a main body that includes a bottom surface and side wall surface and is movable with respect to the opening; and
a plurality of wave suppressing plates that are erected on the bottom surface at an interval in a take-out direction, at least one end of each of the wave suppressing plates being a free end, and a gap being provided from the free end to the side wall surface, wherein the free end of the wave suppressing plate has a curved surface which extends toward a direction opposite to the take-out direction in a plan view.

2. The receiving tray for the pot stand according to claim 1 being characterized in that the receiving tray stores water flowing down from the hole of the upper surface part,
the receiving tray further includes a second wave suppressing plate that is provided in a gap between the plurality of wave suppressing plates in the take-out direction, and
the second wave suppressing plate includes a free end at an end having a curved surface which extends toward a direction opposite to the take-out direction in a plan view so that the wave suppressing plates and the second wave suppressing plate form a zigzag water path.

3. The receiving tray for the pot stand according to claim 2 being characterized in that the second wave suppressing plate extends from the side wall surface of the main body.

4. A receiving tray for a pot stand, the pot stand including an upper surface part having a hole and a side surface portion having an opening, the receiving tray being retractable with respect to the opening, comprising:
a main body that includes a bottom surface and a side wall surface and is movable with respect to the opening; and
a plurality of wave suppressing plates that are erected on the bottom surface at an interval in a take-out direction, at least one end of each of the wave suppressing plates being a free end, and a gap being provided from the free end to the side wall surface, wherein the free end of the wave suppressing plate has an inclined surface which inclines toward a direction opposite to the take-out direction in a plan view.

5. A receiving tray for a pot stand, the pot stand including an upper surface part having a hole and a side surface portion having an opening, the receiving tray being retractable with respect to the opening, comprising:
a main body that includes a bottom surface and a side wall surface and is movable with respect to the opening; and
a plurality of wave suppressing plates that are erected on the bottom surface at an interval in a take-out direction, at least one end of each of the wave suppressing plates being a free end, and a gap being provided from the free end to the side wall surface,
wherein the main body includes a U-shaped inner wall surface in the middle portion to form a groove, the groove engages with a supporting portion which extends vertically from a bottom surface portion of the pot stand to support the upper surface part, and the plurality of wave suppressing plates extends from the inner wall surface toward a periphery.

6. The receiving tray for the pot stand according to claim 5 being characterized in that the receiving tray stores water flowing down from the hole of the upper surface part,
the receiving tray further includes a second wave suppressing plate that is provided in a gap between the plurality of wave suppressing plates in the take-out direction, and the second wave suppressing plate includes a free end at an end having a curved surface which extends toward a direction opposite to the take-out direction in a plan view so that the wave suppressing plates and the second wave suppressing plate form a zigzag water path.

7. The receiving tray for the pot stand according to claim 6 being characterized in that the second wave suppressing plate extends from the side wall surface of the main body.

* * * * *